United States Patent [19]
Patil et al.

[11] Patent Number: 5,665,126
[45] Date of Patent: Sep. 9, 1997

[54] ADDUCTS OF QUINONE COMPOUNDS AND AMINE-CONTAINING POLYMERS FOR USE IN LUBRICATING OILS AND IN FUELS

[75] Inventors: Abhimanyu O. Patil, Westfield; Frank Femino, Kearney, both of N.J.

[73] Assignee: Exxon Chemical Patents Inc, Linden, N.J.

[21] Appl. No.: 701,371

[22] Filed: Aug. 22, 1996

Related U.S. Application Data

[62] Division of Ser. No. 344,775, Nov. 23, 1994, Pat. No. 5,588,972.

[51] Int. Cl.$^6$ .............. C10L 1/22; C10M 149/14
[52] U.S. Cl. .............. 44/312; 508/542; 508/543; 564/403
[58] Field of Search .............. 44/312; 508/542, 508/543; 564/403

[56] References Cited

U.S. PATENT DOCUMENTS

| | | | |
|---|---|---|---|
| 3,007,785 | 11/1961 | Fareri et al. | 44/75 |
| 3,114,755 | 12/1963 | Corey . | |
| 3,219,666 | 11/1965 | Norman et al. | 260/268 |
| 3,432,460 | 3/1969 | Spacht | 260/45.9 |

(List continued on next page.)

FOREIGN PATENT DOCUMENTS

| | | |
|---|---|---|
| 0 487 278 A2 | 5/1992 | European Pat. Off. . |
| 490454 | 6/1992 | European Pat. Off. . |
| 1 228 972 | 11/1966 | Germany . |
| 963263 | 7/1964 | United Kingdom . |

(List continued on next page.)

OTHER PUBLICATIONS

"Redox Polymers Based on Polyamines" E.E. Ergozhin, et al., Reactive Polymers, vol. 16, 1991/1992, p. 321–324 Month Unknown.

Chemical Abstracts No. 108(16): 132,693M, 1988: Month Unknown E.E. Ergozhin et al., Vysokomal, Soedin, Series B. vol. 30, pp. 20–23.

(List continued on next page.)

Primary Examiner—Margaret Medley
Attorney, Agent, or Firm—K. R. Walton

[57] ABSTRACT

Adducts useful as fuel or lubricating oil additives are disclosed. The adducts comprise the reaction product of at least one quinone compound and an amine-containing polymeric material comprising at least one member selected from the group consisting of (i) a first amine-containing polymer derived from a hydrocarbon polymer having a number average molecular weight of from about 300 to 20,000 and (ii) a second amine-containing polymer having a carbon-carbon backbone and formed by the process of polymerizing an organometallic compound-masked nitrogen containing monomer and a polymer chain monomer selected from the group consisting of ethylene, $C_3$ to $C_{25}$ alpha-olefins, and mixtures thereof, followed by deashing to remove the organometallic compound; wherein the amine-containing polymeric material has within its structure at least one reactive amino group selected from the group consisting of primary amino groups, secondary amino groups and mixtures thereof.

The adducts possess dispersant, detergent, antioxidant and anti-corrosion properties.

15 Claims, 1 Drawing Sheet

THERMAL GRAVIMETRIC ANALYSIS IN AIR

U.S. PATENT DOCUMENTS

| | | |
|---|---|---|
| 3,445,391 | 5/1969 | Braid et al. |
| 3,493,511 | 2/1970 | Law ............................ 252/51.5 R |
| 3,660,438 | 5/1972 | Dexter et al. |
| 3,682,980 | 8/1972 | Braid et al. ................... 260/396 R |
| 4,238,628 | 12/1980 | Cahill et al. ....................... 568/736 |
| 4,248,725 | 2/1981 | Crawford et al. ............. 252/51.5 A |
| 4,269,763 | 5/1981 | Miller ............................ 260/45.9 |
| 4,292,047 | 9/1981 | Vartanian et al. ................... 44/312 |
| 4,659,763 | 4/1987 | Gallucci et al. ................... 524/358 |
| 4,831,107 | 5/1989 | Erhan ............................ 528/229 |
| 4,863,623 | 9/1989 | Nalesnik ............................ 252/50 |
| 4,882,413 | 11/1989 | Erhan ............................ 528/229 |
| 4,956,107 | 9/1990 | Gutierrez et al. |
| 4,981,492 | 1/1991 | Blain et al. ............................ 44/317 |
| 5,017,299 | 5/1991 | Gutierrez et al. ................ 252/51.5 R |
| 5,071,919 | 12/1991 | DeGonia et al. ................... 525/285 |
| 5,182,041 | 1/1993 | Benfarmeo et al. ............. 252/51.5 A |
| 5,229,022 | 7/1993 | Song et al. ............................ 252/56 R |
| 5,232,615 | 8/1993 | Patil et al. |
| 5,252,677 | 10/1993 | Tomita et al. ................... 525/333.9 |
| 5,292,813 | 3/1994 | Patil et al. ............................ 525/240 |
| 5,380,591 | 1/1995 | Keogh et al. ....................... 428/379 |
| 5,399,277 | 3/1995 | Patil ............................ 252/51.5 R |
| 5,474,847 | 12/1995 | Keogh et al. ....................... 428/379 |
| 5,565,128 | 10/1996 | Gutierrez ............................ 508/542 |
| 5,588,972 | 12/1996 | Patil et al. ............................ 44/312 |

FOREIGN PATENT DOCUMENTS

| | | |
|---|---|---|
| WO 92/14805 | 1/1992 | WIPO. |
| WO 93/20133 | 4/1993 | WIPO. |
| WO 93/24539 | 5/1993 | WIPO. |
| WO 94/19436 | 12/1993 | WIPO. |
| WO 94/13709 | 6/1994 | WIPO. |

OTHER PUBLICATIONS

Chemical Abstracts No. 92;131719: G.A. Zeinalova et al., "Aminobenzoquinones as Inhibitors of the High Temperature Oxidation of Synthetic Oils," Neftekhimiya, vol. 19, pp. 902–907 (1979) Month Unknown.

"Quinone–Amine Polymers, V. Syntheses and Solubilities of Several Diamine–p–Benzoquinone Oligomers" V.S. NithianaNdam et al., J. Applied Polymer Science, vol. 42,2893–2897 (1991) Month Unknown.

"Novel Water–Displacing Polymers Show Promise in Coating Uses" R. Dagani, Chem. & Engrg. News, vol. 69, Jul. 29, 1991, pp. 20–22.

World Patent Abstracts No. 93–006854/01, 1993 (SU 764331–A1) Month Unknown.

World Patent Abstracts No. 93–006924/01, 1993 (SU 1067805–A1) Month Unknown.

World Patent Abstracts No. 93–006861/01, 1993 (SU 780475–A1) Month Unknown.

World Patent Abstracts No. 88/358532/50, 1988 (J6 3270–648–A) Month Unknown.

Teintex, en 1981 Regroupe Au Sein De L'Industrie Textile, vol. 35, No. 5, May 1970, Paris FR pp. 277–280 Riesz 'Nouveaux Colorants De Cuve Naphtoquinoniques' (Translation, too).

E. E. Ergozhin et al., Khim, Khim, Tekhnol, vol. 33(3) pp. 123–25, 1990 (Chemical Abstracts No. 113(22):192,458b, 1990) Month Unknown.

World Patent Abstracts No. 66349X/35, 1976 (SU 488–831) Month Uknown.

ADDUCTS OF QUINONE COMPOUNDS AND AMINE-CONTAINING POLYMERS FOR USE IN LUBRICATING OILS AND IN FUELS

This is a divisional of application Ser. No. 344,775, now U.S. Pat. No. 5,588,372, filed Nov. 23, 1994.

FIELD OF THE INVENTION

The present invention relates to oil-soluble adducts of quinone compounds and amine-containing polymers. The adducts are useful as dispersant, detergent, antioxidant and anti-corrosion additives for lubricating oil compositions and fuel compositions.

RELATED APPLICATIONS

U.S. Ser. No. 344,432, filed Nov. 23, 1994 entitled "Multifunctional Viscosity Modifiers with Improved Dispersancy and Antioxidancy Derived from Adducts of Quinone" (Docket No. PT-1177) discloses adducts of quinone compounds and amine-containing polymers useful as viscosity modifying, anti-oxidant and anti-corrosion additives for lubricating oil compositions.

U.S. Pat. No. 5,399,277, entitled "Fuel and Lubricant Additives Derived from Dihydroxyaromatic Compounds" discloses fuel and lubricant additives prepared by alkylating and then aminating dihydroxyaromatic compounds.

BACKGROUND OF THE INVENTION

It is known to use polymer additives in fuel compositions and in lubricating oil compositions, including the use of hydrocarbon-polymer-based products as detergent or dispersant additives. U.S. Pat. No. 3,219,666, for example, discloses oil-soluble acylated nitrogen compositions useful as dispersants in lubricating oil compositions prepared by the reaction of hydrocarbon-substituted succinic acid producing compounds (e.g., polyisobutene-substituted succinic anhydrides) with amines such as alkylene polyamines.

U.S. Pat. No. 5,229,022 teaches fuel and lubricating oil additives comprising ethylene-alpha-olefin copolymers terminally substituted with mono- or dicarboxylic acid producing moieties. The acid-substituted polymer can be further reacted with nueleophilic reagents such as amines, alcohols, and metal compounds to give other materials useful as additives, such as dispersants.

EP-A-490454 teaches alkenyl succinimide derivatives useful as dispersant additives, wherein the alkenyl group is derived from a terminally unsaturated atactic propylene oligomer. The succinimide derivative is formed by reacting the succinated oligomer with a $C_1$–$C_{50}$ amine.

Polymer additives capable of providing more than one function are also known. U.S. Pat. No. 4,863,623, for example, discloses a multifunctional lubricant additive which is a VI improver, a dispersant, and an anti-oxidant when employed in a lubricating oil composition. The additive is a reaction product comprising an ethylene copolymer or terpolymer (molecular weight of 5,000 to 500,000) of a $C_3$ to $C_{10}$ alpha-monoolefin and optionally a non-conjugated diene or triene (e.g., EPDM) on which has been grafted an ethylenically unsaturated carboxylic acid material (e.g., maleic anhydride) which is then further derivatized with an amino-aromatic polyamine compound selected from certain N-arylphenylenediamines, aminothiazoles, aminocarbazoles, amino-indazolinones, aminomercaptotriazoles and aminoperimidines.

U.S. Pat. No. 5,182,041 discloses the reaction product of a polyolefin (molecular weight of 300 to 3,500) of a $C_2$ to $C_{10}$ alpha-monoolefin and optionally a non-conjugated diene or triene which has been reacted with an ethylenically unsaturated carboxylic acid material and then further derivatized with an amino-aromatic polyamine like those disclosed in the '623 patent of the preceding paragraph. The reaction product is disclosed to impart dispersancy and anti-oxidant properties to lubricating oil compositions.

U.S. Pat. No. 4,248,725 discloses additives having both dispersant and antioxidant activity in lubricating oil compositions. The additives are produced by reacting a dispersant having free >N—H groups (e.g., a substitute succinimide) with an aldehyde and a compound having antioxidant activity and capable of condensing with the >N—H groups in the dispersant and the aldehyde. Mononuclear and polynuclear substituted phenols and secondary aromatic amines are disclosed to be suitable antioxidants.

There is a continuing need to develop new additives for fuel and lubricating oil compositions, especially additives which can effectively impart more than one property. An advantage of multifunctional additives to the formulator is that two or more discrete additives can be replaced with a single additive, thereby avoiding or minimizing the incompatibility problems and adverse interactions which can often accompany the use of several monofunctional additive components in a composition.

SUMMARY OF THE INVENTION

The present invention is directed to an oil soluble adduct useful as a fuel additive or lubricating oil additive comprising the reaction product of:

at least one quinone compound; and an amine-containing polymeric material comprising at least one member selected from the group consisting of:

(i) a first amine-containing polymer derived from a hydrocarbon polymer having a number average molecular weight of from about 300 to 20,000; and (ii) a second amine-containing polymer having a carbon-carbon backbone and formed by the process of polymerizing an organometallic compound-masked nitrogen containing monomer and a polymer chain monomer selected from the group consisting of ethylene, $C_3$ to $C_{25}$ alpha-olefins, and mixtures thereof, followed by deashing to remove the organometallic compound;

wherein the amine-containing polymeric material has within its structure at least one reactive amine group selected from the group consisting of primary amino groups, secondary amino groups and mixtures thereof.

The first amine-containing polymer comprises the reaction product of an amine compound and a functionalized hydrocarbon polymer. Thus, the first amine-containing polymer can comprise the reaction product of a hydrocarbon polymer functionalized to contain mono- or dicarboxylic acid producing substituents and an amine compound containing at least two reactive amine groups selected from primary amino groups, secondary amine groups, and mixtures thereof. Alternatively, the first amine-containing polymer can comprise the reaction product of a halogenated hydrocarbon polymer and an amine compound containing at least one primary amino group. The first amino-polymer can also comprise the reaction product (i.e., the Mannich base condensate) of an amine compound having at least two reactive primary and/or secondary amino groups, an aldehyde reactant, and a hydrocarbon polymer functionalized to contain a hydroxy aromatic substituent (i.e., an alkylated hydroxy aromatic compound, wherein the alkyl group is derived from the hydrocarbon polymer).

The invention includes a process for producing a composition useful as a fuel additive or lubricating oil additive comprising the steps of providing at least one quinone compound; providing an mine-containing polymeric material as described above; and contacting the quinone compound with the amine-containing polymeric material under conditions and for a time sufficient to react the quinone compound with at least a portion of the reactive amino groups to form a product mixture containing an oil soluble adduct of the quinone compound and the amine-containing polymeric material.

The invention is also directed to an oil soluble berated adduct comprising the reaction product prepared by treating an amine-containing polymeric material as described above with a berating agent before, during, or after contacting the amine-containing polymeric material with a quinone compound.

The invention includes lubricating oil compositions and concentrates and fuel oil compositions and concentrates containing the above-described adducts and borated adducts. The adducts effectively impart dispersant, detergent, antioxidant, and anti-corrosion properties to the compositions and concentrates.

DETAILED DESCRIPTION OF THE INVENTION

Hydrocarbon Polymer

Figure 1:
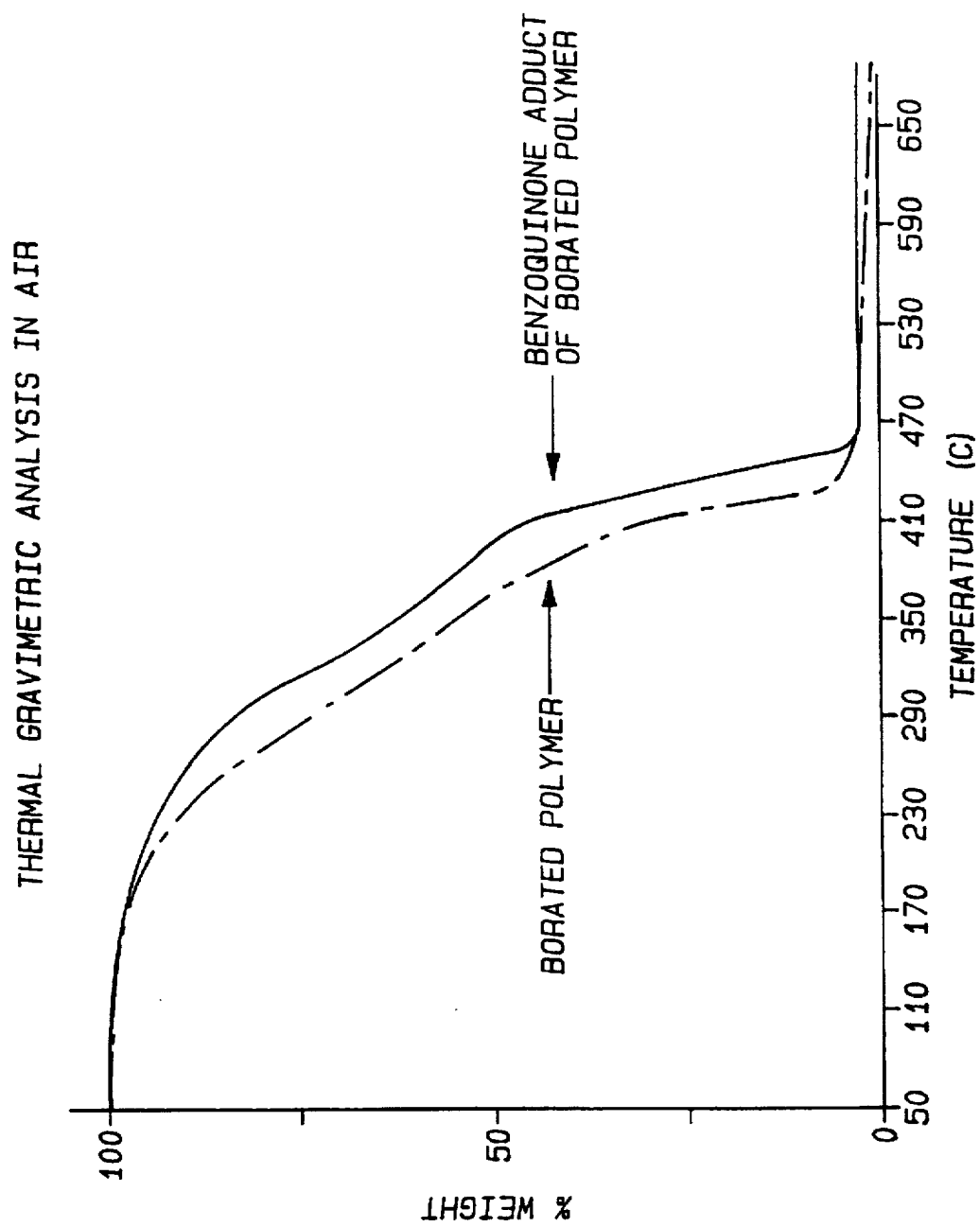
FIGURE 1 is a graphical plot of the thermal gravimetric analysis ("TGA") of the reaction product of benzoquinone with a borated PIBSA-PAM relative to the TGA for the borated PIBSA-PAM itself, as described in Example 7.

The hydrocarbon polymer from which the first amine-containing polymer is derived can be any oil soluble hydrocarbon polymer having a number average molecular weight ("$\overline{M}_n$") in the range of from about 300 to 20,000, (e.g., 300 to 10,000), preferably from 300 to 15,000, (e.g., 700 to 10,000), more preferably from 700 to 15,000 (e.g., 1,000 to 5,000) and most preferably from about 700 to 5,000 (e.g., 800 to 3,000). The $\overline{M}_n$ can be determined by several known techniques such as size exclusion chromatography, which is also known as gel permeation chromatography ("GPC"). GPC also provides molecular weight distribution ("MWD"), also referred to as polydispersity and determined by the ratio of weight average molecular weight ("$\overline{M}_w$") to $\overline{M}_n$. MWD is not a critical aspect of the hydrocarbon polymers employed in this invention. Typically, however, the hydrocarbon polymers have MWD of less than about 6. Furthermore, hydrocarbon polymers prepared by polymerizing monomers in the presence of metallocene catalysts, as described below, generally have an MWD of less than 5 (e.g., from 1 to 5) and typically less than 4.

Preferred hydrocarbon polymers are olefin polymers comprising a major molar amount of $C_2$ to $C_{28}$ hydrocarbon monoolefin; e.g., $C_2$ to $C_5$ hydrocarbon monoolefin. The polymers can be homopolymers such as polypropylene and polyisobutylene or copolymers such as ethylene-propylene copolymer, propylene-isobutylene copolymer, isobutylene-styrene copolymer, etc. The polymers can be butene polymers prepared by polymerization of mixtures of isobutylene, butene-1 and butene-2. Polybutene containing up to about 40 mole % monomer units derived from butene-1 and butene-2 is a preferred polymer. Other copolymers include those in which a minor molar amount of the monomers, e.g., 1 to 10 mole %, is a $C_4$ to $C_{18}$ non-conjugated diolefin, such as EPDM. EPDM copolymers include copolymers of ethylene and propylene with dicyclopentadiene, with ethylidene norbornene and with 1,4-hexadiene.

The olefin polymers may contain aromatic groups (especially phenyl groups and lower alkyl-substituted phenyl groups) and cycloaliphatic groups such as would be obtained from polymerizable cyclic olefins. Accordingly, the monoolefin monomers from which the olefin polymers are prepared can contain aromatic (e.g., styrenyl) and cycloaliphatic groups. However, the olefin polymers preferably have only a small content of such groups (about 10 wt. % or less) and more preferably are free from such groups.

As defined herein, the term hydrocarbon polymers also include polymers containing non-hydrocarbon moieties such as lower alkoxy, lower alkyl mercapto, hydroxy, mercapto and carbonyl, wherein the non-hydrocarbon moieties do not substantially interfere with the functionalization and derivatization chemistries employed in the present invention. When present, such substituted hydrocarbon groups normally will not contribute more than about 10 wt. % of the total weight of the hydrocarbon polymers. Consequently, where the hydrocarbon polymer is an olefin polymer, olefin and diolefin monomers from which the polymer is prepared can also contain such moieties.

Preparing the olefin polymers as described above which meet the various criteria for $\overline{M}_n$ and $\overline{M}_w/\overline{M}_n$ is within the skill of the art and does not comprise part of the present invention. Techniques apparent to those skilled in the art include controlling polymerization temperatures, regulating the amount and type of polymerization initiator and/or catalyst, employing chain terminating groups in the polymerization procedure, and the like. Other conventional techniques such as stripping (including vacuum stripping) a very light end and/or oxidatively or mechanically degrading high molecular weight olefin polymers to produce lower molecular weight olefin polymers can also be used.

The hydrocarbon polymer may be completely saturated, as for example an ethylene-propylene copolymer made by conventional Ziegler-Natta synthesis using hydrogen as a moderator to control molecular weight. Preferably, however, the hydrocarbon polymer is unsaturated, i.e., contains at least one carbon-carbon double bond. The unsaturation can be terminal, internal or both. The presence of unsaturation, especially terminal unsaturation, in the hydrocarbon polymer is advantageous in that certain functionalization chemistries employed in the instant invention rely on the presence of carbon-carbon double bonds. These functionalization chemistries include, for example, thermal "ene" addition of unsaturated carboxylic compounds (e.g., maleic anhydride), use of the Koch reaction to introduce carboxylic acid producing moieties, and the addition of hydroxy aromatic compounds by acid catalyzed alkylation wherein the alkylation product is used for preparing Mannich condensates. Each of these chemistries is described more fully below.

Accordingly, particularly suitable hydrocarbon polymers are alpha-olefin homopolymers, copolymers of alpha-olefin comonomers, and copolymers of ethylene and alpha-olefin comonomers, wherein the polymer contains at least some terminal and/or internal unsaturation. The unsaturated alpha-olefin homo- and copolymers are polymers of at least one $C_3$ to $C_{28}$ alpha-olefin having the formula $H_2C\!\!=\!\!CHR'$ wherein R' is straight or branched chain alkyl radical comprising 1 to 26 carbon atoms. The unsaturated ethylene-alpha-olefin copolymers are polymers of ethylene and at least one alpha-olefin of the above formula, wherein R' is preferably an alkyl of from 1 to 18 carbon atoms and more preferably is alkyl of from 1 to 8 carbon atoms, and most preferably from 1 to 2 carbon atoms. Useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and of ethylene and butene-1. The copolymers may optionally contain a minor amount, e.g., 0.5 to 5 mole %, of a $C_4$ to $C_{18}$ non-conjugated diolefin comonomer.

The molar ethylene content of the unsaturated ethylene copolymers employed in this invention is preferably in the range of about 20 to 80%, and more preferably 30 to 70%. When propylene and/or butene-1 are employed as comonomer(s) with ethylene, the ethylene content of such copolymers is more preferably between 45 and 65%, although higher or lower ethylene contents may be present.

The unsaturated alpha-olefin homopolymers, alpha-olefin copolymers and ethylene-alpha-olefin copolymers preferably have a high degree of terminal ethenylidene unsaturation, wherein at least about 30% of the polymer chains possess terminal ethenylidene unsaturation. Preferably at least 50%, more preferably at least 60%, and most preferably at least 75% (e.g. 75–98%), of such polymer chains exhibit terminal ethenylidene unsaturation. The percentage of polymer chains exhibiting terminal ethenylidene unsaturation may be determined by FTIR spectroscopic analysis, titration, or proton or $C^{13}$ NMR.

The unsaturated hydrocarbon polymers with high terminal ethenylidene unsaturation (e.g., up to 95% or more terminally unsaturated polymer chains) may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising the reaction or complexation product of a cyclopentadienyl-containing transition metal compound (also referred to as a metallocene) and a cocatalyst. The metallocene is typically a cyclopentadienyl derivative of a Group IVB-VIB transition metal of the Periodic Table of the Elements disclosed in the *Handbook of Chemistry and Physics*, 61 st edition, CRC Press, 1980. Particularly desirable are the metallocenes of a Group IVB metal such as titanium, zirconium, and hafnium. The metallocene is converted into an active polymerization catalyst by reacting or combining it with a co-catalyst, which is typically either an aluminoxane or an ionic activator, e.g., an ion exchange compound or an anion of a Lewis acid.

Methods for the preparation of the above-described unsaturated hydrocarbon polymers using metallocene-based catalyst systems are known in the art and do not comprise part of this invention. The polymers can be prepared, for example, using the methods disclosed in U.S. Pat. Nos. 4,542,199, 4,668,834, 4,704,491, 4,937,299, 5,084,534, 5,229,022, 5,278,119, and 5,324,800; EP-A-277004 and 520732; and WO-A-87/03887 and 92/00333; all of which are herein incorporated by reference in their entireties. A particularly preferred method for the preparation of the ethylene-alpha-olefin copolymer using metallocene catalysts is a process utilizing highly dilute alpha-olefin feedstreams, as described in commonly assigned, copending U.S. Ser. No. 992,690, filed Dec. 17, 1992, herein incorporated by reference in its entirety. A particularly preferred method for preparing the alpha-olefin homopolymers and copolymers is a process utilizing highly dilute alpha-olefin feedstreams, as described in commonly assigned, copending U.S. Ser. No. 257,398, filed Jun. 9, 1994, herein incorporated by reference in its entirety.

Ethylene copolymers having high terminal vinylidene unsaturation, which are preferred copolymers for use in the invention (and which are typically prepared using metallocene-based catalysts), may be characterized by the formula POLY—C(R')=$CH_2$ wherein R' is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the R' alkyl group will vary depending on the comonomer(s) selected for use in the polymerization. A minor amount of the polymer chains can contain terminal ethenyl (i.e., vinyl) unsaturation, i.e. POLY—CH=$CH_2$, and a portion of the polymers can contain internal monounsaturation, e.g. POLY—CH=CH(R'), wherein R' is as defined above.

The alpha-olefin homo- and copolymers possessing a high degree of terminal ethenylidene unsaturation are also characterized by the formula POLY—(CR')=$CH_2$ wherein POLY represents the alpha-olefin polymer chain and R' is as defined above. For copolymers the identity of the R' alkyl group in a given chain depends upon which of the selected comonomers terminates the chain.

The hydrocarbon polymer from which the first amine-containing polymer can be derived can be a mixture or blend of two or more of the heretofore described hydrocarbon polymers. When a functionalization chemistry requires unsaturation (e.g., the Koch reaction as described below), the hydrocarbon polymers employed in the mixture are each required to contain unsaturation. On the other hand, a mixture of saturated and/or unsaturated hydrocarbon polymers can be employed for other functionalization chemistries, such as free radical grafting to introduce carboxylic moieties and halogenation in the preparation of amine-substituted hydrocarbon polymers, both described below.

Whatever functionalization chemistry is employed, the hydrocarbon polymers can be mixed together prior to charging to the reaction zone, or they can be charged separately to the reaction zone. When charged separately, the polymers can be added simultaneously or sequentially in any order. When charged sequentially, subsequently charged polymers must be present in the reaction zone for a time and under conditions sufficient to effect the desired functionalization.

When two hydrocarbon polymers are employed together, they are generally present in a weight:weight ratio of from about 10:90 to 90:10 and preferably from 20:80 to 80:20. When more than two polymers are employed, each polymer is present in an amount of at least about 5 wt. %, and preferably at least 10 wt. %.

An illustrative hydrocarbon polymer mixture is a mixture comprising polyisobutylene and an ethylene-alpha-olefin copolymer wherein at least about 30 of the copolymer chains possess terminal ethenylidene unsaturation. Preferably, the ethylene-alpha-olefin is selected from ethylene-propylene copolymer and ethylene-butene-1 copolymer. The polyisobutylene typically has a $\overline{M}_n$ in the range from about 700 to 3,000, preferably from 900 to 3,000, and most preferably from 1,500 to 2,500.

Amine-Containing Polymeric Materials

The amine-containing polymeric materials employed in this invention may be a hydrocarbon polymer, as earlier defined herein, which has been chemically modified to contain within its structure at least one primary or secondary amino group. Alternatively, the amine-containing polymeric material can be prepared by polymerization ethylene and/or one or more alpha-olefin monomers with a suitable nitrogen-containing monomer, wherein the resulting polymer either contains, or can be subsequently modified by chemical treatment of the N-containing moieties directly incorporated into the polymer to contain, at least one primary or secondary amino group.

Amine-Containing Derivatives of Hydrocarbon Polymer-Substituted Mono- or Dicarboxylic Acid Producing Materials Amine-containing polymers can be formed by first functionalizing a hydrocarbon polymer to contain within its structure mono- and/or dicarboxylic acid producing moieties (e.g. acid, anhydride or ester groups) and then subsequently reacting the hydrocarbon-polymer substituted mono- and/or dicarboxylic acid producing materials with an amine compound containing at least two reactive amino groups, i.e., primary and secondary amino groups.

The hydrocarbon polymer substituted mono- or dicarboxylic acid producing material, e.g., acid, anhydride, or ester, used in the invention includes the reaction product of a long chain hydrocarbon polymer, generally a polyolefin, with a monounsaturated carboxylic reactant. The monounsaturated carboxylic reactant is typically a monounsaturated monocarboxylic acid producing compound or a monounsaturated dicarboxylic acid producing compound or mixtures thereof. Preferably, the reactant comprises at least one member selected from the group consisting of (i) monounsaturated $C_4$ to $C_{10}$ dicarboxylic acid wherein (a) the carboxyl groups are vicinal, (i.e., located on adjacent carbon atoms) and (b) at least one, preferably both, of said adjacent carbon atoms are pan of said mono unsaturation; (ii) derivatives of (i) such as anhydrides or $C_1$ to $C_5$ alcohol derived mono- or diesters of(i); (iii) monounsaturated $C_3$ to $C_{10}$ monocarboxylic acid wherein the carbon-carbon double bond is conjugated to the carboxy group, i.e., of the structure

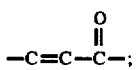

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Exemplary monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The hydrocarbon polymer can be functionalized by reaction with the monounsaturated carboxylic reactant using a variety of methods. For example, the polymer can be first chlorinated or brominated to about 1 to 8 wt. % chlorine or bromine, based on the weight of polymer, by passing the chlorine or bromine through the polymer at a temperature of about 60° to 250° C. for about 0.5 to 10 hrs. The halogenated polymer may then be reacted with sufficient monounsaturated carboxylic reactant at about 100° to 250° C. for about 0.5 to 10 hrs., so the product obtained will contain the desired number of moles of the monounsaturated carboxylic reactant per mole of the halogenated polymer. Processes of this general type are taught, e.g., in U.S. Pat. No. 3,087,436, 3,172,892, and 3,272,746. Alternatively, the polymer and the monounsaturated carboxylic reactant are mixed and heated while adding chlorine or bromine to the hot material. Processes of this type are disclosed, e.g., in U.S. Pat. Nos. 3,215,707, 3,231,587, 3,912,764, 4,110,349, and 4,234,435.

The hydrocarbon polymer and the monounsaturated carboxylic reactant can also be contacted at elevated temperatures to cause a thermal "ene" reaction to occur. Generally, the polymer and carboxylic reactant will be contacted with stirring and in the absence of $O_2$ and water (e.g., under $N_2$) in a carboxylic reactant to polymer mole ratio of about 1:1 to 10:1 at a temperature of about 120° to 260° C. for about 1 to 20 hrs. Thermal "ene" processes are described in U.S. Pat. No. 3,361,673 and U.S. Pat. No. 3,401,118.

While halogenation normally helps increase the reactivity of the hydrocarbon polymer with the monounsaturated reactant, it is not necessary for hydrocarbon polymers having a high content of terminal unsaturation. Hydrocarbon polymers having a high level of terminal unsaturation (e.g., ethylene-alpha-olefin polymers with at least about 30 wt. % terminal ethenylidene) readily react via the thermal "ene" reaction under conditions avoiding the formation of tar and sediment to add the monounsaturated carboxylic reactant at the unsaturated sites. The thermal "ene" reaction also avoids or minimizes the introduction of chlorine in the product, whose presence may pose environmental concerns. Accordingly, thermal "ene" chemistry is preferred for the reaction of hydrocarbon polymers with high terminal unsaturation.

The hydrocarbon polymer can also be functionalized to contain carboxylic acid moieties by grafting with a monounsaturated carboxylic reactant, as described above, in the presence of a free radical initiator, wherein the carboxylic acid moieties are randomly attached along the polymer chains.

When performed in solution, the grafting takes place at an elevated temperature in the range of about 100° to 260° C., preferably 120° to 240° C. Preferably, free-radical initiated grafting is accomplished in a mineral lubricating oil solution containing about 1 to 50 wt. % polymer, preferably 5 to 30 wt. % polymer, based on the initial total oil solution.

The free-radical initiators which may be used include peroxides, hydroperoxides, and azo compounds, and are preferably those which have a boiling point greater than about 100° C. and thus decompose thermally within the grafting temperature range to provide free-radicals. Representative of these free-radical initiators are azobutyronitrile, 2,5-dimethylhex-3-ene-2,5-bis-tertiary-butyl peroxide and dicumene peroxide. The initiator is typically used in an mount of between about 0.005% and 1% by weight based on the weight of the reaction mixture solution. Typically, the aforesaid monounsaturated carboxylic reactant material and free-radical initiator are used in a weight ratio range of from about 1:1 to 30:1, preferably 3:1 to 6:1. The carboxylic reactant and polymer are typically used in a reactant: polymer mole ratio range of about 1:1 to 10:1. The grafting is preferably carried out in an inert atmosphere, such as under a nitrogen blanket.

In the solid or melt process for forming a graft polymer, the unsaturated carboxylic acid with the optional use of a radical initiator is grafted on molten copolymer using masticating or shearing equipment. The temperature of the molten material in this process may range from about 150° to 400° C. Processes for free-radically grafting polymers are described, for example, in U.S. Pat. Nos. 4,505,834, 4,749, 505 and 4,863,623; and in GB-A-2055852.

Hydrocarbon polymers containing at least one carbon-carbon unsaturation can also be functionalized to contain carboxylic acid moieties via a Koch reaction, wherein the polymer is selectively functionalized at the unsaturated olefinic sites. A Koch process comprises contacting a polymer composition comprising at least one hydrocarbon polymer having at least one carbon-carbon double bond, with carbon monoxide and a Koch catalyst. The catalyst is preferably a classical Broensted acid or Lewis acid catalyst. The Koch reaction is conducted in a manner and under conditions sufficient to form, theoretically, a carbenium ion at the site of the carbon-carbon double bond, which carbenium ion can be reacted with carbon monoxide to form theoretically, an acylium cation, which in turn is reacted with at least one nucleophilic trapping agent selected from the group consisting of water, at least one hydroxyl group containing compound, and at least one thiol compound, wherein water forms a carboxylic acid; alcohol forms a carboxylic ester; and thiol forms a carboxylic thioester.

As a result of Koch reaction, a carboxylic acid moiety having the formula (I)

     (I)

is attached to a carbon atom of the polymer backbone wherein Y is O or S; and $R^5$ is H, hydrocarbyl, substituted hydrocarbyl, aryl, or substituted aryl. More particularly, such Koch compositions comprise functionalized polymer of the formula (II):

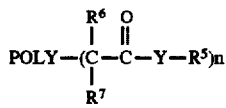     (II)

wherein POLY is a hydrocarbon polymer backbone; n is a number greater than 0; $R^5$, $R^6$, $R^7$ are the same or different and are each H, hydrocarbyl, or polymeric groups. The

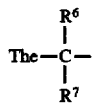

moiety is not added to the polymer via the Koch reaction in the sense of being derived from a separate reactant even though the functional group of formula (II) is represented by

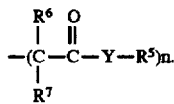

Thus, POLY— and the

moieties are derived from the starting hydrocarbon polymer containing carbon-carbon unsaturation, as heretofore defined.

Preferably the "leaving group" (—$YR^5$) has a $pK_a$ less than or equal to 12, preferably less than 10, and more preferably less than 8 as determined by the $pK_a$ of the corresponding H—Y—$R^5$ trapping agent. (—$YR^5$) is referred to as a leaving group, because it is the site at which amine compounds react to form the acylated nitrogen derivatives employed in the present invention. The $pK_a$ of the leaving group determines how readily the functionalized polymer will react with the amine compounds. Y is preferably O. $R^5$ is preferably selected from a substituted hydrocarbyl, an aryl and a substituted aryl group, because these groups are generally more reactive with amine compounds. As used here, substituted hydrocarbyl means an aliphatic and/or alicyclic hydrocarbon group which contains one or more non-hydrocarbon moieties as substituents. The non-hydrocarbon moieties can be any moieties which do not substantially interfere with the Koch functionalization reaction. Suitable non-hydrocarbon moieties include heteroatom and heteroatom-containing substituents such as halo (e.g., chloro or fluoro), haloalkyl (e.g., chloromethyl, chloroethyl, fluoromethyl, and the like), and alkoxy. Similarly, substituted aryl means an aromatic hydrocarbon group containing one or more non-hydrocarbon moieties which do not substantially interfere with the Koch functionalization reaction, including, for example, halophenyl (e.g., chlorophenyl), haloalkylphenyl (chloromethylphenyl), dihalophenyl (dichlorophenyl), and halotolyl (chlorotolyl).

A preferred $R^5$ is 2,4-dichlorophenyl. Thus, a correspondingly preferred trapping agent for preparing the functionalized hydrocarbon polymer is 2,4-dichlorophenol. Other preferred $R^5$'s include 2-chloro-4-methylphenyl, 2,2,2-trifluoroethyl and 1,1,1,3,3,3-hexafluoroisopropyl, for which the corresponding preferred trapping agents are 2-chloro-4-methylphenol (i.e., o-chlorocresol), trifluoroethanol and hexafluoroisopropanol.

In the Koch process, a neo functional group (i.e., the acyl functional group is attached to a tertiary carbon atom of the polymer backbone) will generally result from an ethylenic double bond in which one of the carbon atoms of the double bond is fully substituted with hydrocarbyl groups. An iso functional group (i.e., the acyl functional group is attached to a secondary carbon atom of the polymer backbone) will generally result from an ethylenic bond in which each carbon in the double bond has one hydrogen substituent. Thus, terminal ethenylidene groups (earlier defined) in the polymer chain result in neo functional groups, and terminal vinyl will result in iso functional groups. Preferably, at least about 50 mole %, more preferably at least 60 mole %, and most preferably at least 80 mole % (e.g., 90 mole % or more) of all of the carboxylic groups are neo.

In accordance with the Koch process, carboxyl groups, including carboxylic acid or carboxylic esters, can be formed at moderate temperatures and pressures at the point of unsaturation of the polymer of the present invention. The polymer is heated to a desired temperature range which is typically between about –20° to 200° C. and preferably from 0° to 80° C. The pressure in the reactor can be maintained based on the CO source, with pressures up to about 34,500 $kP_a$ (5,000 psig) with a preferred range of from about 3,450 to 20,700 $kP_a$ (500 to 3,000 psig).

The relative amounts of reactants and catalyst and the reaction conditions are controlled in a manner sufficient to functionalize typically at least about 40, preferably at least 80, more preferably at least 90, and most preferably at least 95 mole % of the carbon-carbon double bonds present in the starting polymer.

The catalyst preferably has a Hammet Scale Value acidity ($H_O$) of less than –7, preferably from –8.0 to –11.5, in order to be sufficiently active, particularly to form neo structures. Useful catalysts include $H_2SO_4$, $BF_3$, and HF. The nucleophilic trapping agent is preferably added in combination with the catalyst as a catalyst complex. Preferred catalyst complexes include (BF$_3$•H$_2$O), BF$_3$•substituted phenols), and (BF3•halosubstituted alcohols). Illustrative preferred catalyst complexes are BF$_3$•2,4-dichlorophenol and BF$_3$•hexafluoroisopropanol.

Normally, not all of the hydrocarbon polymer is functionalized, regardless of which of the above functionalization chemistries is employed. Unfunctionalized polymer typically is not removed from the reaction mixture, because such removal is difficult and would be commercially infeasible. The product mixture, stripped of any residual reactant, is then employed for further reaction with the amine compound.

Amine compounds useful as reactants with the hydrocarbon polymer substituted mono- or dicarboxylic acid material, i.e., acylating agent, are those containing at least two reactive amino groups, i.e., primary and secondary amino groups, and mixtures of such amines. They include polyalkylene polyamines of about 2 to 60 (e.g. 2 to 30), preferably 2 to 40 (e.g. 3 to 20) total carbon atoms and about 2 to 12 (e.g., 2 to 9), preferably 3 to 12, and most preferably 3 to 9 nitrogen atoms in the molecule. The mines may be hydrocarbyl amines or may be hydrocarbyl amines including other groups, e.g., hydroxy groups, alkoxy groups, amide groups, nitriles, imidazoline groups, and the like. Such mines should be capable of reacting with the carboxylic acid moieties in the functionalized hydrocarbon polymer and with the quinone compounds through the amino groups.

Non-limiting examples of suitable amine compounds include: 1,2-diaminoethane; 1,3-diaminopropane; 1,4-diaminobutane; 1,6-diaminohexane; polyethylene amines such as diethylene triamine, triethylene tetramine, and tetraethylene pentamine ("TEPA"); polypropylene amines such as 1,2-propylene diamine, di-(1,2-propylene) triamine and di-(1,3-propylene)triamine; N,N-dimethyl-1,3-diaminopropane; N,N'-di-(2-aminoethyl) ethylene diamine; N-dodecyl-1,3-propane diamine; di-, and tri-tallow amines; amino morpholines; and mixtures thereof.

Useful mines also include alicyclic diamines, commercial mixtures of amine compounds such as polyethylene polyamines averaging 5 to 7 nitrogen atoms per molecule available under the trade names E-100 (Dow Chemical) and HPA-X (Union Carbide), polyoxyalkylene polyamines, and the polyamido and related amines described in U.S. Pat. Nos. 4,857,217, 4,963,275, and 4,956,107.

The amine compound can be a heavy polyamine, which is defined herein as a mixture of higher oligomers of polyalkylene polyamines, having an average of at least about 7 nitrogens per molecule. A preferred heavy polyamine is a mixture of polyethylene polyamines containing essentially no TEPA, at most small amounts of pentaethylene hexamine, and the balance oligomers with more than 6 nitrogens and more branching than conventional commercial polyamine mixtures, such as the E-100 and HPA-X mixtures noted in the preceding paragraph. A useful heavy polyamine composition is commercially available from Dow Chemical under the tradename HA-2. Useful heavy polyamines are further described in U.S. Ser. No. 273,294, filed Jul. 11, 1994, herein incorporated by reference in its entirety.

The amine-containing derivative may be prepared by reacting the amine compound with the hydrocarbon polymer substituted mono- or dicarboxylic acid material dissolved or diluted in an inert organic liquid (e.g., mineral oils) to a concentration of about 5 to 95 wt. %. The reaction is generally conducted at about 100° to 250° C. for about 1 to 10 hrs. until the desired amount of water is removed. The heating is preferably carried out to favor formation of imides and/or amides, rather than amides and salts. Reaction ratios of mono- or dicarboxylic acid material to equivalents of amine can vary considerably, depending upon the reactants and type of bonds formed. Generally from 0.1 to 1.0, preferably about 0.2 to 0.6, e.g. 0.4 to 0.6, moles of mono- or dicarboxylic acid moiety content is used, per equivalent of amine. Of course, the relative proportions of amine to polymer substituted carboxylic material and the reaction conditions are controlled such that the resulting derivative has amino groups available for subsequent reaction with a quinone compound.

Mannich Condensation Products

The amine-containing polymeric materials employed in this invention can be Mannich condensation products formed by condensing a hydrocarbon polymer substituted hydroxy aromatic compound with an aldehyde and an amine compound. The hydrocarbon polymer substituted hydroxy aromatic compound can be prepared by alkylation of a hydrocarbon polymer containing at least one carbon-carbon double bond with a hydroxy aromatic compound as heretofore described.

The hydroxy aromatic compound can be any aromatic compound having at least one hydroxy group and at least one hydrogen substituted on an aromatic ring of the aromatic compound. Hydroxy aromatic compounds including those compounds having the formula (III):
wherein Ar represents

   (III)

wherein Ar represents 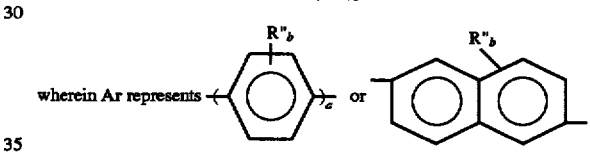

wherein a is 1 or 2; R" is a C$_1$ to C$_3$ hydrocarbyl or a halogen radical such as the bromide or chloride radical; b is an integer from 0 to 2; and c is an integer from 1 to 2. Illustrative Ar groups are phenylene, biphenylene, naphthylene and the like.

The hydrocarbon polymer and the hydroxy aromatic compound are contacted in the presence of at least one acidic alkylation catalyst (e.g., H$_3$PO$_4$, H$_2$SO$_4$, BF$_3$ and the like) under conditions effective to alkylate the aromatic group of the hydroxy aromatic compound. Alkylation processes are described, for example, in U.S. Pat. Nos. 3,539,633, 3,649, 229 and 5,017,299.

The aldehyde can be any simple aliphatic aldehyde or aldehyde-producing material, such as formaldehyde, paraformaldehyde and acetaldehyde.

The amine compound can be any of the amine compounds described above.

Processes for condensing the hydrocarbon polymer alkylated hydroxy aromatic compound, aldehyde, and amine are well known to the skilled artisan and include those described in U.S. Pat. Nos. 3,634,515, 3,649,229, 3,442,808, and 3,798,165.

Amino-Phenol Mannich Base Condensates

The amine-containing polymeric materials employed in this invention can also be the Mannich condensation products prepared by reacting a hydrocarbon polymer substituted mono- or dicarboxylic acid producing material with an amine-substituted hydroxy aromatic compound (e.g., aminophenol) to form a hydrocarbon polymer substituted amide- or imide-containing phenol intermediate adduct, and then condensing the intermediate adduct with an aldehyde and an amine compound. The amine-substituted hydroxy aromatic compound can comprise any aromatic compound having at least one hydroxy group and at least one amine-containing group substituted on at least one ring of the aromatic compound. Suitable N-hydroxyaryl amines include those of formula (IV):

wherein Ar is as defined for formula (III).

The aldehyde and the amine compound condensed with the intermediate adduct can be any of those described earlier.

Processes for forming the hydrocarbon-polymer substituted amide- or imide-containing adduct and for condensing the adduct with an aldehyde and an amine are known. See, for example, U.S. Pat. No. 5,128,056.

Hydrocarbon Polymer Substituted With Amine

The amine-containing polymeric materials useful in this invention can be a hydrocarbon polymer substituted with an amine such that the amine is directly attached to the hydrocarbon polymer. The amine substituted hydrocarbon polymers can be prepared by first halogenating the polymer and then in a subsequent step displacing the halogen group(s) on the resulting halogenated polymer with at least one amine compound. Suitable halogenation processes and displacement processes are described in U.S. Pat. Nos. 3,275,554, 3,438,757, 3,565,804, 4,000,353, and 5,225,092. It is believed that the halogenation of hydrocarbon polymers having a high terminal unsaturation content (e.g., ethylene-alpha-olefin copolymer with at least 30% terminal ethenylidene unsaturation) results in halogenated polymer chains having a substantial amount of terminal halide, as described in U.S. Pat. No. 5,225,092.

Suitable amine compounds include those described above and additionally include amine compounds having one primary amino group, such as $C_2$ to $C_{60}$ hydrocarbyl primary amines including methylamine, ethylamine, propylamine and the like. The amine compounds containing at least two reactive amino groups earlier described, however, are preferred.

Amine-containing polymers used in this invention can also be prepared by the direct incorporation of masked, nitrogen-containing monomers ("MNCM") into homopolymers and copolymers, including polyolefins such as ethylene-propylene copolymers ("EPM"), to form copolymers, terpolymers and tetrapolymers containing the MNCM. The nitrogen-containing monomer is an unsaturated compound which is copolymerizable with polymer chain monomers ("PCM"), viz. olefins such as ethylene and propylene, using a Ziegler catalyst. The amine-substituted polymers preferably comprise polymer chains exhibiting a generally uniform distribution of amino functionality and a low halogen content and are essentially devoid of organic halides.

The term nitrogen-containing monomer ("NCM") means the unsaturated, nitrogen-containing monomers which contain at least one primary amino and/or secondary amino group. Exemplary of nitrogen-containing monomers are norbornenyl-methyl amines and imines and preferably 5-norbornenyl-2-methylamine, 5-norbornene-2,3-dimethylamine, 5-norbornene-2-ethylamine.

The term masked, nitrogen-containing monomer ("MNCM") refers to the reaction products formed by the reaction of the nitrogen-containing monomer and a metallic organic compound masking agent. The masked, nitrogen-containing monomer so formed is used as the actual comonomer in the polymerization process. The NCM is preferably masked in a reaction with non-halogenated metallic compounds such as organoaluminum compounds under controlled conditions and then contacted with suitable monomers for production of the amine-containing polymer.

The polymer chain monomers normally used in the production of these polymers, preferably ethylene and $C_3$ to $C_{25}$ alpha-olefins and mixtures thereof, may optionally contain a third type of monomer which is an easily polymerizable non-conjugated diene, suitably straight chain, hydrocarbon di-olefins or cycloalkenyl substituted alkenes, having about 6 to about 15 carbon atoms.

The polymerization process is performed in an otherwise conventional manner using suitable methods and catalysts known to be effective for such polymerization and can be carried out at any temperature and pressure suitable for Ziegler catalysis. The polymerization can be carried out in the presence of a molecular weight regulator such as hydrogen to produce an amine-substituted polymer having any particular desired molecular weight. The polymerization is quenched at the exit of the reactor by the introduction of suitable amounts of water, lower alkanol, or aqueous acid (e.g. aqueous HCl) as quench liquid. The desired amino functional group incorporated into the amine-substituted polymer as the masked functional group, can be regenerated by removal of the masking metal, through use of conventional de-ashing techniques, wherein the quenched polymerization products, containing masked-functionalized polymer, the polymerization catalysts, and unreacted monomers, are contacted with an aqueous liquid, e.g., water, aqueous solutions containing suitable mineral acids. The resulting hydrolysis reactions ("de-ashing") liberate the metal masking agent and generate the amino functional group, thereby forming the polymer. Further description of the formation of these polymers is found in U.S. Pat. No. 4,987,200.

The compositions of the present invention are to be used as additives in lubricating oil compositions and in fuel compositions. Accordingly, the number of amino groups in the amine-containing polymer materials used to form the inventive compositions must be controlled to maintain oil solubility. Generally amine-containing polymeric materials formed by chemical modification of hydrocarbon polymers which are useful in making the additive of the invention have on average within their structure at least about 0.5 and preferably at least 0.7 (e.g., 0.8 to 3) reactive amine groups per molecule. Methods for controlling the number of amino groups in the polymeric materials and for controlling the ratio of amino groups to quinone compound are in the possession of the skilled artisan in light of the teachings presented herein.

Quinone Compound

Quinone compounds useful in the present invention include 1,2- and 1,4-quinone compounds having at least one hydrogen on the quinone ring and mixtures thereof. Suitable quinones include 1,4-quinone compounds of formula (V):

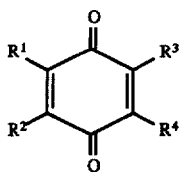

(V)

wherein $R^1$, $R^2$, $R^3$ and $R^4$ are independently selected from hydrogen, halogen, hydrocarbyl, and substituted hydrocarbyl; provided that at least one of $R^1$, $R^2$, $R^3$ and $R^4$ is hydrogen; or $R^3$ and $R^4$ are as defined above and $R^1$ and $R^2$ are joined to form a hydrocarbocyclic ring or a substituted hydrocarbocyclic ring, provided that at least one of $R^3$ and $R^4$ is hydrogen. 1,4-Quinone compounds of formula (V) include, but are not limited to, 1,4-benzoquinone, 2-methyl-1,4-benzoquinone, 2-chloro-1,4-benzoquinone, 2,5-dimethyl-1,4-benzoquinone, 1,4-naphthoquinone, 2-methyl-1,4-naphthoquinone, 2,5- dichloro- 1,4-benzoquinone, 1,4-anthraquinone, 2-chloromethyl-1,4-benzoquinone, and 5,6, 7,8-tetrahydro-1,4-naphthoquinone.

Suitable quinones include 1,2-quinone compounds of formula (VI):

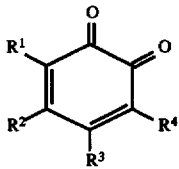

(VI)

wherein $R^1$, $R^2$, $R^3$ and $R^4$ are as defined above for formula (V), provided that at least one of $R^1$, $R^2$, $R^3$ and $R^4$ is hydrogen; or $R^3$ and $R^4$ are as defined above for formula (V) and $R^1$ and $R^2$ are joined to form a hydrocarbocyclic ring or a substituted hydrocarbocyclic ring, provided that at least one of $R^3$ and $R^4$ is hydrogen; $R^1$ and $R^4$ are as defined above and $R^2$ and $R^3$ are joined to form a hydrocarbocyclic ring or a substituted hydrocarbocyclic ring, provided that at least one of R1 and $R^4$ is hydrogen.

1,2-Quinone compounds of formula (b) include, but are not limited to, 1,2-benzoquinone, 1,2-naphthoquinone, 3-chloro-1,2-naphthoquinone, 3-chloro-1,2-benzoquinone, 3-methyl-1,2-benzoquinone, 4-methyl-1,2-benzoquinone, 5,6,7,8-tetrahydro-1,2-naphthoquinone, 1,2-anthraquinone, and 3,4-dimethyl-1,2-benzoquinone.

The preferred quinone compounds for use in the present invention are 1,4-benzoquinone, 2-methyl-1,4-benzoquinone, 1,2-naphthoquinone, and 1,4-naphthoquinone. The more preferred quinone compounds are 1,4-benzoquinone and 1,4-naphthoquinone. The most preferred is 1,4-benzoquinone, which is alternatively referred to herein simply as benzoquinone.

Methods for preparing the quinone compounds are known to a person of ordinary skill in the art. See, for example, the methods disclosed in *Kirk-Othmer Encyclopedia of Chemical Technology*, volume 19, 3d edition (Wiley-Interscience, New York, 1982), pp. 598–606.

Reaction of Quinone Compounds with Amine-Containing Polymeric Materials

The quinone compounds are reacted with the amine-containing polymeric materials heretofore described; i.e., polymer materials having long chain hydrocarbon character and containing at least one reactive primary or secondary amino group, to produce the composition of the invention useful as a fuel or lubricating oil additive. The reaction may be carried out by contacting an effective amount of a quinone compound with an amine-containing polymer material for a time and under conditions sufficient to form an adduct having dispersant, detergent, anti-oxidant, and/or anti-corrosion properties. The quinone compound must have at least one unsubstituted position on the quinone ring (i.e., at least one quinone ring hydrogen) to undergo reaction with the amine-containing polymeric material. A quinone compound with more than one ring hydrogen can undergo reaction with different polymer molecules, each containing one reactive amino group, to join or couple them together. Furthermore, if the polymeric material has two or more reactive amino sites per molecule and the quinone has at least two quinone ring hydrogens, a more complex adduct can result, even to the point of producing an oil insoluble, crosslinked material.

Those skilled in the art will recognize that the amount of quinone compound utilized will depend upon (i) the number of reactive amino groups present in the amine-containing polymeric material, (ii) the number of quinone ring hydrogens in the quinone compound, and (iii) the number of such amino groups which it is desired to react. The skilled artisan will also recognize that, where coupling or crosslinking is possible, the degree of coupling or crosslinking can be controlled (e.g., to preserve oil solubility or to enhance effectiveness of the resulting adduct as an additive) by suitable manipulation of reaction conditions in combination with controlling the ratio of the number of reactive quinone ring hydrogens to the number of amino groups in the polymeric material. Generally, it is preferred to use from about 0.01 to 4 moles, preferably from 0.1 to 1 mole of quinone compound per molar equivalent of reactive amino group in the polymeric material.

Normally, the quinone compound is contacted directly with the amine-containing polymer to form the adduct. As an alternative, however, the corresponding dihydroxyaromatic compound (e.g., hydroquinone) can be added and the quinone compound (1 ,4-benzoquinone) formed in situ by prior, simultaneous or subsequent contact of an oxidizing agent (e.g., air) with the reaction mixture.

The adduct-forming reaction generally proceeds at atmospheric pressure, but elevated pressures can be used. The reaction may be conducted using an inert solvent or diluent. Suitable solvent/diluents include toluene, xylene, mineral oil, THF, hexane, heptane, and the like. The reaction temperature generally ranges from about 20° C. to the reflux temperature of the solvent when a solvent is used or to the decomposition temperature of the mixture. Preferably, the temperature ranges from about 25° to 250° C., more preferably from 50° to 200° C. Reaction time is generally from about 1 minute to 72 hrs., preferably from 10 minutes to 24 hrs, and more preferably 1 to 12 hours.

The reaction and product may be represented strictly for purposes of illustration by the following reaction between benzoquinone and 2 moles of an amine-containing derivative of a dicarboxylic acid producing material containing a reactive primary amino group:

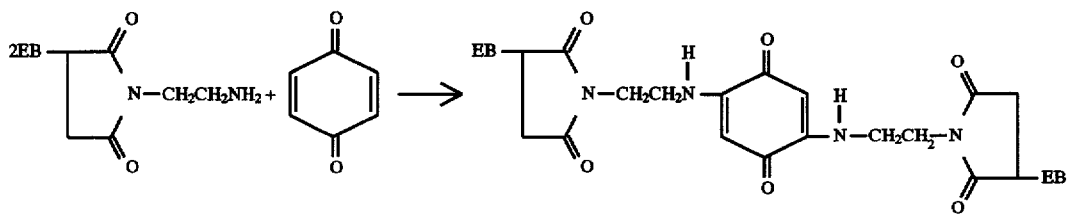

wherein EB is an ethylene-butene-1 copolymer. If the amine-containing EB derivative contained more than one reactive amino group per molecule, then the products will be more complex.

Boration

Boron-containing compositions useful as fuel and lubricating oil additives can be prepared by treating with a borating agent at least one amine-containing polymeric material (as heretofore described) having within its structure at least two reactive amino groups selected from the group consisting of primary amino groups, secondary amino groups, and mixtures thereof; and before, during, or after the treating step, contacting the amine-containing polymeric material with a quinone compound in an amount and under conditions sufficient to react the quinone compound with at least a portion of the reactive amino groups to obtain a borated adduct containing at least about 0.01 wt. % of boron based on the total weight of the borated adduct.

The borated adduct can contain up to about 3 to 10 wt. % boron, but preferably has 0.05 to 2 wt. %, e.g. 0.05 to 0.7 wt. % boron. The boron, which appears to be in the product as dehydrated boric acid polymers (primarily $(HBO_2)_3$), is believed to attach to the dispersant as amine salts, e.g., the metaborate salt of said amine dispersants.

Suitable borating agents include boron halides, (e.g. boron trifluoride, boron tribromide, boron trichloride), boron acids, and simple esters of the boron acids (e.g., trialkyl borates containing 1 to 8 carbon alkyl groups such as methyl, ethyl, n-octyl, 2-ethylhexyl, etc.).

The step of contacting the amine-containing polymeric material with a quinone compound is preferably carried out before or after treating with a borating agent, and more preferably after treating. Whether conducted sequentially or concurrently, the boration reaction is typically carried out by adding from about 0.05 to 5, e.g. 1 to 3 wt. % (based on the weight of the amine-containing polymeric material) of the borating agent, and heating with stirring at from about 90° to 250° C., preferably 135° to 190° C., e.g. 140° to 170° C., for from about 1 to 10 hrs. followed by nitrogen stripping in said temperature ranges. The borating agent is preferably boric acid which is most usually added as a slurry to the reaction mixture.

A preferred low sediment process involves borating with a particulate bode acid having a particle size distribution characterized by a φ value of not greater than about 450. The process is described in U.S. Pat. No. 5,430,105, herein incorporated by reference in its entirety.

There must be sufficient reactive amino (i.e., sufficient reactive —NH sites) available for reaction with both the borating agent and the quinone compound. This can of course be achieved by employing an amount of reactive amino groups in the amine-containing polymeric material which equals or exceeds the total amount of (i) boron in the borating agent employed in the treating step and (ii) quinone ring hydrogens in the quinone compound employed in the contacting step. An equal or excess amount of reactive amino is not necessary, however, since by suitable control of the reaction conditions (i.e., time, temperature) as described above, an excess of borating agent and/or quinone compound can be employed to produce the boron-containing compositions of the invention. In general, from about 0.01 to 4 moles of quinone compound and from about 0.01 to 1 molar equivalents of boron can be employed per molar equivalent of reactive amino.

Lubricating Oil and Fuel Compositions

The quinone-amine-containing polymer adducts of the present invention possess good dispersancy, detergency, anti-corrosion and anti-oxidant properties, which make them useful as additives in fuels and in lubricating oils. The additives of the invention are used by incorporation into the lubricating oils and fuels. Incorporation may be done in any convenient way and typically involves dissolution or dispersion of the additives into the oil or fuel in a dispersant-, antioxidant-, and/or anti-corrosion-effective amount. The blending into the fuel or oil can occur at room or elevated temperature. Alternatively, the additives can be blended with a suitable oil-soluble solvent/diluent (such as benzene, xylene, toluene, lubricating base oils and petroleum distillates, including the various normally liquid petroleum fuels noted below) to form a concentrate, and then the concentrate can be blended with a lubricating oil or fuel to obtain the final formulation. Such additive concentrates will typically contain on an active ingredient (A.I.) basis from about 10 to 80 wt. %, typically 20 to 60 wt. %, and preferably from about 40 to 50 wt. % additive, and typically from about 40 to 80 wt. %, preferably from about 40 to 60 wt. % base oil (or fuel) based on concentrate weight.

When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to 0.5 wt. %, and preferably 0.005 to 0.15 wt. %, based on the total weight of the composition, will usually be employed.

Fuel compositions of this invention can contain other conventional additives in addition to the additive of the invention. These can include anti-knock agents, cetane improvers, metal deactivators, deposit modifiers/preventors, and anti-oxidants.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.) Alkylene oxide polymers and interpolymers and derivatives thereof where the terminal hydroxyl groups have been modified by esterification, etherification, etc., constitute another class of known synthetic lubricating oils. Another suitable class of synthetic lubricating oils comprises the esters of dicarboxylic acids. Esters useful as synthetic oils also include those made from $C_5$ to $C_{12}$ monocarboxylic acids and polyols and polyol ethers such as neopentyl glycol, etc. Silicon-based oils such as the polyalkyl-, polyaryl-, polyalkoxy-, or polyaryloxysiloxane oils and silicate oils comprise another useful class of synthetic lubricants. Unrefined, refined and rerefined oils can be used in the lubricants of the present invention.

The additives of the present invention may be mixed with other types of conventional additives, each selected to perform at least one desired function. Among the other additives which may be in the lubricating oil formulation are metal containing detergent/inhibitors, viscosity modifiers, and anti-wear agents. The metal detergent/inhibitors are generally basic or overbased alkali or alkaline earth metal salts or mixtures thereof (e.g. mixtures of Ca and Mg salts) of one or more organic acids (e.g., sulfonates, naphthenates, phenates and the like). Viscosity modifiers are generally hydrocarbon polymers or polyesters, optionally derivatized to impart dispersancy or some other property, having number average molecular weights of from $10^3$ to $10^6$. The anti-wear agents are typically oil-soluble zinc dihydrocarbyl dithiophosphates.

Other additives which may be employed in the formulation are pour depressants, friction modifiers, foam inhibitors, demulsifiers, flow improvers, and seal swell control agents. Conventional dispersants, antioxidants, and corrosion inhibitors can also be employed in addition to the additives of the invention.

Compositions, when containing one or more of these additives, typically are blended into the base oil in amounts which are effective to provide their normal attendant function. In such compositions, the additives of the present invention are generally employed (e.g., as a dispersant additive) in an amount of about 0.01 to 10 wt. %, preferably 0.1 to 10 wt. %, most preferably 0.1 to 6 wt. %, based upon the total weight of the composition.

Additive concentrates comprising concentrated solutions of the additives of this invention together with one or more of these other additives can be prepared by adding the additives to the base oil, wherein the subject additives of this invention are present in concentrate amounts as described above. The collective amounts of the subject additive together with other additives is typically from about 2.5 to 90 wt. %, preferably 15 to 75 wt. %, and most preferably 25 to 60 wt. % additives with base oil as the balance. The concentrate will typically be formulated to contain the additives in the amounts necessary to provide the desired concentration in the final formulation when the concentrate is combined with a predetermined amount of base lubricant.

Unless otherwise indicated, all of the weight percents expressed herein are based on the active ingredient content of the additive, and/or upon the total weight of any additive package or formulation which will be the sum of the A.I. weight of each additive plus the weight of the total oil or diluent.

EXAMPLES

The invention is described in more detail, though only by way of illustration, in the following examples. The polyamine ("PAM") employed in the examples is a mixture of ethylene polyamines containing about 32 wt. % nitrogen and having a total base number of about 1,200 mg KOH per gram of sample. The mixture is composed primarily of polyethylene polyamines heavier than TEPA and has an average of about 6 nitrogen atoms and about 10 carbon atoms per molecule.

Example 1

500 grams of an amine-containing polymer having 1.59 wt. % N (=0.568 mole total N) prepared by the condensation of PAM with a polyisobutenyl-substituted succinic anhydride derived from a polyisobutylene ($\overline{M}_n$ of 950) and having a saponification number of 112 (A.I. of about 90 wt. %) were mixed with 30.7 grams (=0.28 mole) of benzoquinone dissolved in 150 ml of tetrahydrofuran ("THF"). The solution was stirred at room temperature for 48 hrs., during which time the reaction mixture changed color from yellow-orange to dark red. After 48 hrs., the THF was removed by stripping with nitrogen and by high vacuum. An IR spectrum of the product showed absorption peaks characteristic of a benzoquinone substituent at 1,600; 1,500; 820 and 750 $cm^{-1}$, in addition to peaks due to the amine-containing polymeric moiety.

Example 2

200 grams of the amine-containing polymer of Example 1 (=1.59 moles total N) was mixed with 12.3 grams (=0.11 mole) of benzoquinone dissolved in 100 ml of THF. The solution was refluxed for three hours, after which the THF was removed by stripping with nitrogen at room temperature for 1 hour. The resulting product was diluted with heptane and then filtered, alter which the heptane was removed by nitrogen stripping at room temperature and then by high vacuum stripping at room temperature. An IR spectrum of the product showed absorption peaks characteristic of the benzoquinone moiety at 1,600, 1,500, 820 and 750 $cm^{-1}$, in addition to peaks characteristic of the amine-containing polymeric moiety.

Example 3

68 grams of an amine-containing polymer having 1.20 wt. % N (=0.126 mole total N) prepared by the reaction of ethylenediamine with a chlorinated polyisobutylene (7.0 wt. % Cl; PIB $\overline{M}_n$=950) was dissolved in 200 ml of THF, and the resulting solution was then mixed with 3.1 grams (0.029 mole) of benzoquinone. The mixture was refluxed for 3 hrs., after which the THF was removed by stripping with nitrogen at room temperature for 1 hr. The product was diluted with heptane and filtered, after which the heptane was removed by nitrogen stripping at room temperature, followed by high vacuum stripping at room temperature. The product contained 0.76 wt. % N. An IR spectrum of the product showed absorption peaks characteristic of the benzoquinone moiety at 1,562, 1,500, 820 and 750 cm$^{-1}$, in addition to peaks characteristic of the amine-containing polymeric moiety.

Example 4

A product was prepared in the manner described in Example 3, except that 100 grams (=1.98 wt. % N, 0.14 mole total N) of the amine-containing polymer, 7.6 grams (0.07 mole) of benzoquinone, and 100 ml of THF were employed. The resulting product contained exhibited IR absorption peaks characteristic of the benzoquinone moiety and the amine-containing polymeric moiety.

Example 5

200 grams of the 1.59 wt. % N, amine-containing polymer described in Example 1 (=0.13 mole total N) were heated to 80° to 90° C., followed by addition of 6.9 grams (=0.064 mole) of solid benzoquinone to the heated polymer. The mixture was maintained at a temperature of 80° to 90° C. for 1.5 hrs. in order to react substantially all of the benzoquinone. The resulting product exhibited IR absorption peaks for both the quinone and amine-containing polymer moieties.

Example 6

100 grams of an amine-containing polymer having 0.90 wt. % N (=0.064 mole total N) prepared by the condensation of PAM with a polyisobutenyl-substituted succinic anhydride derived from a polyisobutylene ($\overline{M}_n$ of 2,200) and having a saponification number of 51.3 (A.I. of about 86 wt. %) were mixed with 3.47 grams (=0.032 mole) of benzoquinone dissolved in 100 ml of THF. The solution was refluxed for 3 hrs., after which the THF was removed by stripping with nitrogen at room temperature for 1 hr. The product was then diluted with heptane, filtered, and the heptane removed by nitrogen stripping at room temperature and then by high vacuum at room temperature. The product contained 0.87 wt. % N, and its IR spectrum showed absorption peaks characteristic of a benzoquinone moiety at 1,600, 1,500, 820 and 750 cm$^{-1}$, in addition to peaks characteristic of an amine-containing polymer moiety.

Example 7

3.47 grams (0.032 mole) of benzoquinone were mixed with 100 grams of a borated amine-containing polymer dissolved in 100 ml of heptane and having about 0.23 wt. % B and about 0.9 wt. % N (=0.064 mole total N), wherein the borated polymer was prepared by reacting boric acid with the mineral oil diluted condensation product of PAM and a polyisobutenyl-substituted succinic anhydride derived from a 2,225 $\overline{M}_n$ polyisobutylene and having a saponification number of about 49 (A.I. of about 86 wt. %). The solution was stirred at room temperature for 24 hrs. The product was then diluted by adding more heptane and filtered, after which the heptane was removed by stripping with nitrogen and then by high vacuum.

The product was analyzed by thermal gravimetric analysis ("TGA") under air (Perkin Elmer Model II) to measure its thermooxidative stability. A TGA analysis of the borated amine-containing polymer reactant was also made as a comparison. The TGA data are presented in FIGURE 1. These data indicate that the benzoquinone adduct of the borated polymer is more stable than the borated polymer precursor. For example, these data indicate that the adduct is more stable than the precursor by about 60° C. at a weight loss of 50 wt. %.

Example 8

An amine-containing polymer having 0.8 wt. % N was prepared by condensing PAM with an ethylene-butene copolymer ($\overline{M}_n$=5000; ethylene content=47 mole %, terminal vinylidene=63%) functionalized via the Koch reaction to contain 2,4-dichlorophenyl ester groups. 100 grams of the amine-containing polymer were dissolved in 500 ml of a 4:1 heptane: toluene solvent mixture, after which 1 gram of naphthoquinone (=0.0063 mole) was added. The mixture was stirred at room temperature for 24 hrs., during which time the mixture changed color from yellow to dark red. The heptane and toluene were then removed by rotary evaporation at 70° C. followed by high vacuum at room temperature.

Example 9—Sludge and Varnish Distribution Tests

The dispersancy of the products of Examples 1, 3, 6 and 7 were tested for sludge inhibition via the SIB test and for varnish inhibition via the VIB test.

In the SIB test, a dispersant is added to a clear, bright supernatant oil obtained from a sued crankcase oil composition that has been used in a taxicab. The used crankcase contains a base mineral lubricating oil, a viscosity modifier, a pour point depressant and a zinc dialkyldithiophosphate anti-wear additive, but itself has no dispersant additive. This supernatant oil has been separated from the oil insoluble sludge precursors which on heating under the conditions of the SIB test tend to form additional oil-insoluble deposits. The sludge inhibition of the dispersant is then determined by heating the dispersant-oil blend in air for several hours and comparing the mount of sludge (in mg) formed in the blend to the mount formed by a similarly treated blank containing only the oil. SIB values are reported on a normalized scale of 1 (high inhibition) to 10 (no inhibition).

In the VIB test, a dispersant is admixed with the same test oil as used in the SIB test. The oil is then subjected to one or more test cycles that include heat soaking, heat cycling, and exposure to NO, SO$_2$, and water. Varnish inhibition is determined by visual inspection of the wall surfaces of the test flasks and comparison to a blank with no additive. VIB values are reported on a scale of 1 (high inhibition) to 11 (no inhibition).

A more detailed description of the SIB and VIB tests can be found in U.S. Pat. No. 4,954,572 and U.S. Pat. No. 5,271,856, both incorporated herein by reference in their entireties.

The results of the SIB and VIB are presented in Table 1. The results show that the products of the invention have useful sludge and varnish inhibiting properties, which in several cases exceed those of their respective amine-containing polymer precursors.

TABLE 1

| Product (Example No.) | SIB (mg) | VIB (mg) |
|---|---|---|
| 1 | 3.25 | 6 |
| Precursor of 1 | 4.44 | 8 |
| 3 | 4.83 | 3+ |
| Precursor of 3 | 4.46 | 4+ |
| 6 | 1.53 | 3 |
| Precursor of 6 | 5.04 | 4 |
| 7 | 1.79 | 5 |
| Precursor of 7 | 2.07 | 4- |

1. Precursor of 1 is the amine-containing polymer reactant of Example 1; i.e., PIBSA-PAM product based on 950 $\overline{M}_n$ PIB.
2. Precursor of 3 is the amine-containing polymer reactant of Example 3; i.e., PIB-substituted PAM based on 950 $\overline{M}_n$ PIB.
3. Precursor of 6 is the amine-containing polymer reactant of Example 6; i.e., PIBSA-PAM product based on 2,200 $\overline{M}_n$ PIB.
4. Precursor of 7 is the borated amine-containing polymer reactant of Example 7; i.e., borated PIBSA-PAM based on 2,225 $\overline{M}_n$ PIB.
5. A product showing no sludge inhibition would have a SIB value of 10. A product with no varnish inhibition would have a VIB value of 11.

What is claimed is:

1. An oil soluble adduct useful as a fuel additive or lubricating oil additive comprising the reaction product of:

at least one quinone compound having at least one hydrogen on the quinone ring; and an amine-containing polymer having within its structure at least one reactive amino group selected from the group consisting of primary amino groups, secondary amino groups and mixtures thereof, wherein the amine-containing polymer comprises a Mannich condensation product of at least one alkyl substituted hydroxy aromatic compound formed by the alkylation of a hydroxy aromatic compound with a hydrocarbon polymer having a number average molecular weight of from about 300 to 20,000, an aldehyde reactant, and an amine compound having at least two reactive amino groups selected from the group consisting of primary amino groups, secondary amino groups, and mixtures thereof.

2. The adduct according to claim 1, wherein the hydrocarbon polymer is selected from the group consisting of alpha-olefin homopolymers, alpha-olefin copolymers, ethylene-alpha-olefin copolymers, and mixtures thereof.

3. The adduct according to claim 2, wherein the hydrocarbon polymer comprises ethylene-alpha-olefin copolymer derived from ethylene and at least one $C_3$ to $C_{28}$ alpha-olefin having the formula $H_2C=CHR'$, wherein R' is a straight or branched chain alkyl radical comprising 1 to 26 carbon atoms, the ethylene-alpha-olefin copolymer having an ethylene content of about 20 to 80 mole percent, and wherein at least about 30 percent of the polymer chains possess terminal ethenylidene unsaturation.

4. The adduct according to claim 1, wherein the hydrocarbon polymer comprises polyisobutylene.

5. The adduct according to claim 1, wherein the quinone compound is selected from the group consisting of 1,4-benzoquinone and 1,4-naphthoquinone.

6. The adduct according to claim 1, wherein the amine compound comprises a polyalkylene polyamine having about 2 to 60 carbon atoms and about 2 to 12 nitrogen atoms per molecule.

7. The adduct according to claim 6, wherein the quinone compound is selected from the group consisting of 1,4-benzoquinone and 1,4-naphthoquinone.

8. A lubricating oil composition containing from about 0.01 to 20 weight percent of the adduct of claim 1.

9. A lubricating oil concentrate containing from about 20 to 60 weight percent of the adduct of claim 1.

10. A fuel composition containing from about 0.001 to 0.5 weight percent of the adduct of claim 1.

11. A process for producing a composition useful as a fuel additive or lubricating oil additive comprising the steps of:

(A) providing at least one quinone compound having at least one hydrogen on the quinone ring;

(B) providing an amine-containing polymer having within its structure at least one reactive amino group selected from the group consisting of primary amino groups, secondary amino groups and mixtures thereof, wherein the amine-containing polymer comprises a Mannich condensation product of at least one alkyl substituted hydroxy aromatic compound formed by the alkylation of a hydroxy aromatic compound with a hydrocarbon polymer having a number average molecular weight of from about 300 to 20,000, an aldehyde reactant, and an amine compound having at least two reactive amino groups selected from the group consisting of primary amino groups, secondary amino groups, and mixtures thereof; and (C) contacting the quinone compound with the amine-containing polymer under conditions and for a time sufficient to react the quinone compound with at least a portion of the reactive amino groups to form a product mixture containing an oil soluble adduct of the quinone compound and the amine-containing polymer.

12. The process according to claim 11, wherein the quinone compound is selected from the group consisting of 1,4-benzoquinone and 1,4-naphthoquinone.

13. The process according to claim 11, wherein the step of providing the quinone compound comprises contacting a dihydroxyaromatic compound with an oxidizing agent.

14. The process according to claim 11, wherein the amine compound comprises a polyalkylene polyamine having about 2 to 60 carbon atoms and about 2 to 12 nitrogen atoms per molecule.

15. The process according to claim 11 wherein the quinone compound is selected from the group consisting of 1,4-benzoquinone and 1,4-naphthoquinone.

* * * * *

UNITED STATES PATENT AND TRADEMARK OFFICE
CERTIFICATE OF CORRECTION

PATENT NO. : 5,665,126
DATED : September 9, 1997
INVENTOR(S) : Abhimanyu O. Paul. et al It is certified that error appears in the above-indentified patent and that said Letters Patent is hereby corrected as shown below:

Column 24, claim 15, line 1, after "according to claim", delete "11" and insert therefor -- 14 --.

Signed and Sealed this

Eleventh Day of November, 1997

Attest:

BRUCE LEHMAN

Attesting Officer

Commissioner of Patents and Trademarks